Dec. 26, 1939.  T. L. GENTER  2,184,451
FILTER
Filed July 27, 1936  3 Sheets-Sheet 1
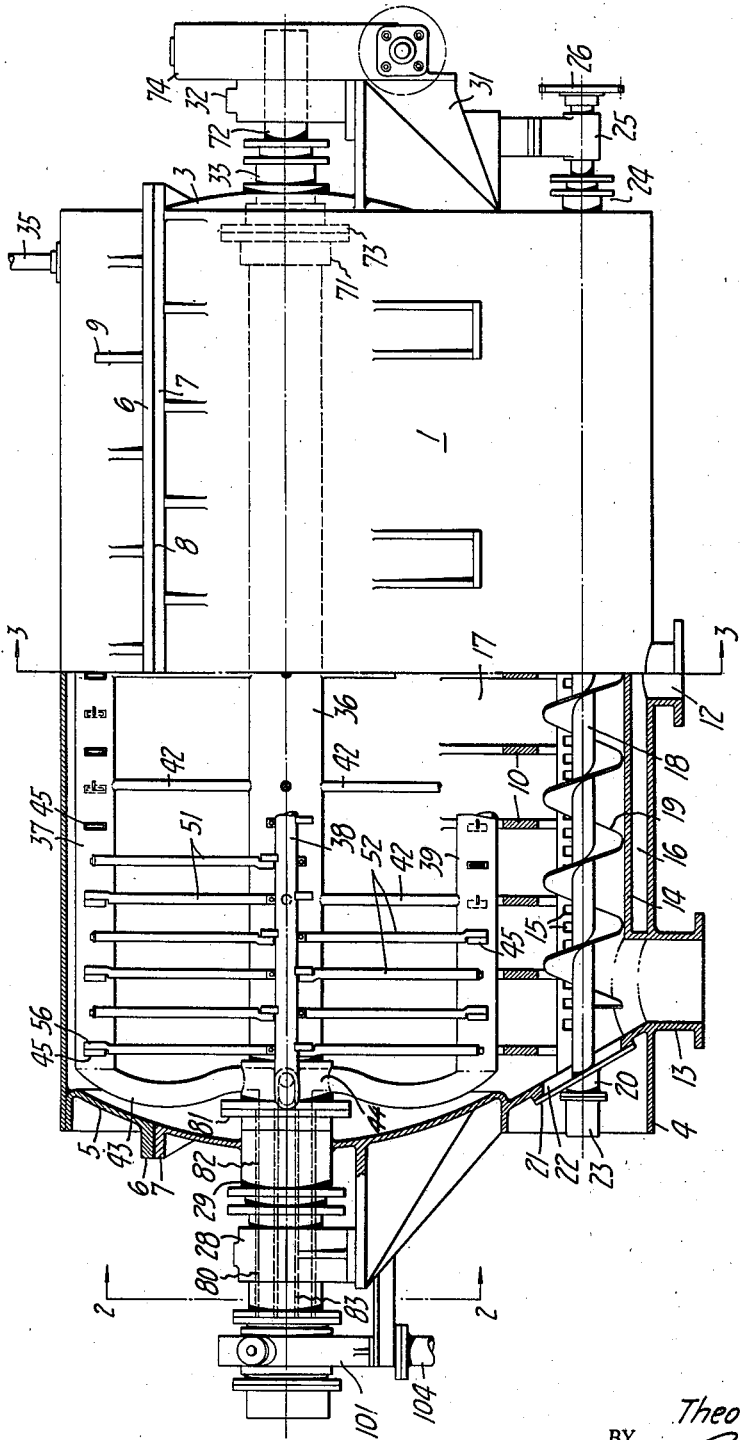
FIG_1
INVENTOR.
Theodore L. Genter
BY
ATTORNEY.

Dec. 26, 1939.   T. L. GENTER   2,184,451
FILTER
Filed July 27, 1936   3 Sheets-Sheet 2
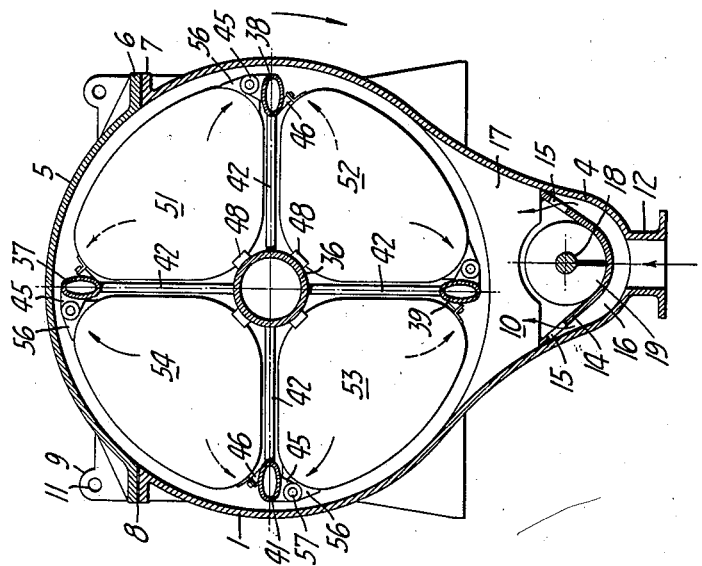
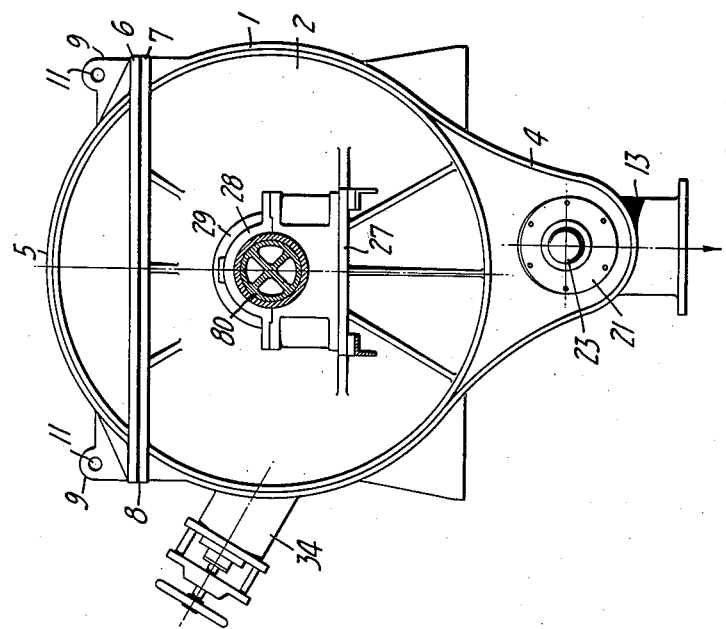
INVENTOR.
Theodore L. Genter
BY
ATTORNEY.

Dec. 26, 1939.   T. L. GENTER   2,184,451
FILTER
Filed July 27, 1936   3 Sheets-Sheet 3
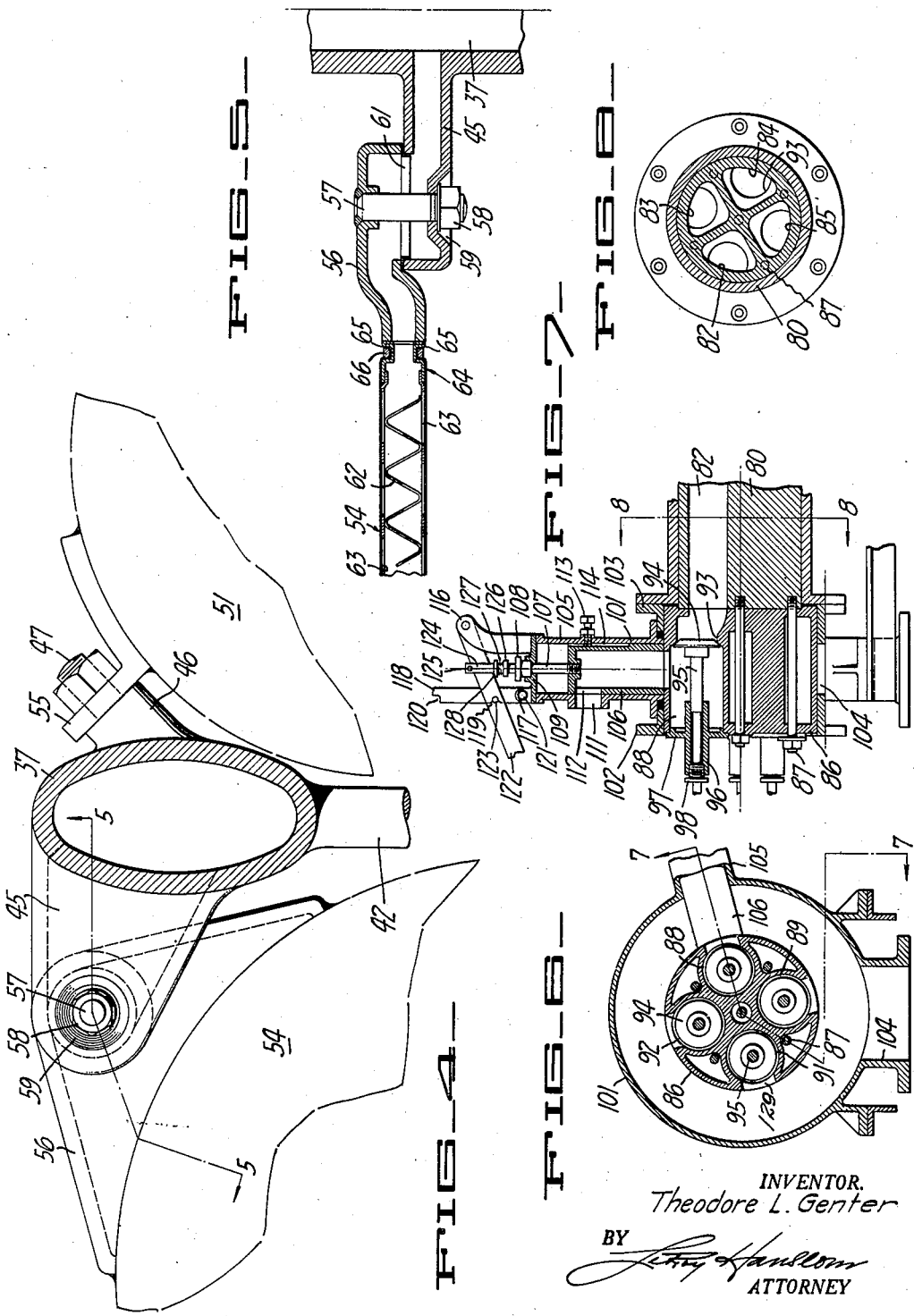
INVENTOR.
Theodore L. Genter
BY
ATTORNEY Patented Dec. 26, 1939

2,184,451

UNITED STATES PATENT OFFICE 2,184,451

FILTER

Theodore L. Genter, Oakland, Calif., assignor to Oliver United Filters Incorporated, San Francisco, Calif., a corporation of Nevada Application July 27, 1936, Serial No. 92,780

6 Claims. (Cl. 210—200)

This invention relates to filters of the disc type wherein filtration is effected under the influence of a differential pressure and the cake formed on the filter medium is discharged by the aid of a reverse pressure.

In the past it has been the practice to support the discs of a rotary disc filter on a hollow central shaft and to discharge the filtrate passing through the filter medium through nipples or fittings connecting the disc sectors to the shaft. This requires a large heavy shaft and is objectionable for the reason that the effective filtering surface of the discs is decreased. Also, it has been the practice to discharge the cake formed on the filtering surface of each disc simultaneously by the use of a blow back or reverse pressure. The application of a reverse pressure, applied to the interior of the filter medium, causes the filter medium to belly outwardly. It is common practice to space the filter discs sufficiently far apart to permit cake building over the entire surface and on both sides of the discs, and then leave free space enough between two adjacent cakes to permit them to be discharged and fall freely into the scroll or hopper underneath the filter shell. However it frequently happens that during the cake discharging operation adjacent cakes arch over or "twin", thereby causing difficulty in properly discharging the filter.

One of the objects of this invention is the provision of a method whereby the cakes formed on adjacent disc sectors may be discharged alternately rather than simultaneously, thereby not only preventing the twinning of cakes, but at the same time permitting a closer spacing of the discs, with a corresponding increase in filter area.

It is common practice to prevent the filter discs from warping out of line (i. e., out of a plane at right angles to the center shaft) by stiffening the entire series of discs by means of longitudinal rods, clips, clamps, or spacers.

Another object of this invention is the provision of a number of longitudinal members, each performing a threefold duty: (a) a support for the disc sectors, (b) an efficient spacer or stiffener for the entire series of discs, and (c) an outlet or conduit for the filtrate issuing from a series of sectors.

Still another object of the invention is the provision of a coupling for securing the disc sectors to the longitudinally extending filtrate manifolds.

A further object of the invention is the provision of an automatic valve whereby adjacent disc sectors may be alternately subjected to a reverse fluid pressure.

The invention possesses other advantageous features, some of which with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Figure 1 is a side elevation, partly in section, of a disc filter embodying the objects of my invention.

Figure 2 is a vertical section taken on the line 2—2 of Figure 1.

Figure 3 is a vertical section taken on the line 3—3 of Figure 1.

Figure 4 is a detail view of the coupling for connecting the disc sectors to the filtrate manifolds.

Figure 5 is a section taken on the line 5—5 of Figure 4.

Figure 6 is a section taken through the automatic valve used for subjecting the filter to a differential pressure for effecting filtration and for applying a reverse pressure alternately to adjacent disc sectors.

Figure 7 is a section taken on the line 7—7 of Figure 6.

Figure 8 is a section taken on the line 8—8 of Figure 7.

As best shown in Figures 1, 2, and 3, my invention comprises a shell or casing 1 of general cylindrical form and provided with outwardly dished heads 2 and 3. The bottom of the casing 1 terminates in a scroll compartment 4, reinforced by spaced vertical webs 10, while its top is closed by a cover 5 having a peripheral flange 6 adapted to register with a peripheral flange 7 formed around the upper part of the casing 1. The cover 5 may be secured to the casing 1 by bolts passing through the peripheral flanges 6 and 7, and a gasket 8 may be placed between the peripheral flanges 6 and 7 to form an air-tight seal. In order to enable the cover 5 to be lifted from the shell 1, it is provided with ears 9 having openings 11 therein, through which a hoisting hook may be inserted. The cover 5 is placed at the maximum height above the horizontal center line of the shell or casing 1, to permit removal of the cradle with 75% of the sectors at one operation and at the same time to provide the cover 5 with a minimum area. Communicating with the scroll chamber 4 is a pulp or slurry inlet 12 and a cake discharge outlet 13, and disposed within the scroll compartment 4 is a false bottom or pan 14 provided with openings 15. The scroll compartment 4 together with the pan 14 defines a chamber 16 through which the pulp or slurry entering the inlet 12 must pass in order to reach the main chamber 17 of the casing 1. Supported on a shaft 18 disposed within the scroll compartment 4 immediately above the pan 14, is a scroll 19. The left hand end of the shaft 18 is journaled in a flanged bearing 20 carried by a plate 21 which in turn is secured in registration with an opening 22 formed in the dished head 2. The outer end of the shaft 18 is enclosed by means of a flanged cap 23 bolted or screwed to the flanged bearing 20. The right hand end of the shaft 18 passes through a stuffing box 24 secured to the dished head 3, and is journaled in a bearing 25. The outer end of the shaft is provided with a sprocket 26 for connecting it to any suitable driving mechanism. Formed integrally with the dished head 2 is a bracket 27, and supported on this bracket is a bearing 28. Secured to and extending through the dished head 2 substantially in line with the axis of the casing 1 is a stuffing box 29. Formed integrally with the dished head 3 is a bracket 31 adapted to support a bearing 32. Secured to and extending through the dished head 3 in line with the axis of the bearing 28 and stuffing box 29 is a stuffing box 33. The casing 1 is provided on one side with an inspection port 34 (Figure 2) and with a vent pipe 35 (Figure 1).

Rotatably disposed within the casing 1 is a frame or cradle adapted to support a plurality of spaced sectionalized filter discs. The cradle comprises a hollow central shaft 36, the axis of which is coincident with the axis of the bearings 28 and 32. Symmetrically disposed about the hollow shaft 36 and in spaced relation thereto are four elliptically shaped filtrate manifolds 37, 38, 39 and 41 (Figures 1 and 3). These manifolds are held in spaced relation with respect to the hollow shaft 36 by means of radius rods 42. The left hand ends of the filtrate manifolds 37, 38, 39 and 41 communicate by means of radially extending pipes 43 with a flanged casting 44 welded or otherwise secured to the left hand end of the hollow shaft 36. Each of the filtrate manifolds 37, 38, 39 and 41 is provided along its length in spaced relation with fittings or couplings 45 and with a boss 46 provided with a threaded stud 47. As shown in Figure 4, the coupling 45 extends to the left, while the boss 46 with its threaded stud 47 extends to the right. However, it is to be noted from an inspection of Figures 1 and 3 that the relative positions of these members are reversed in every alternate set of these members along the length of the filtrate manifolds. The reason for this reversal of members will be set forth in connection with the description of the operation of the filter. Secured to the hollow shaft 36 are a plurality of sets of saddles or U-shaped clips 48, there being four clips to each set, symmetrically disposed about the shaft 36. Each of these sets of clips lies in a common plane with its corresponding fitting 45 and threaded stud 47. The frame or cradle thus formed by the hollow shaft 36 and the filtrate manifolds 37, 38, 39 and 41 constitutes a support for a plurality of spaced sectionalized filter discs. Each disc consists of four sectors, 51, 52, 53 and 54. Each sector is seated at its inner end or apex on one of the saddles or U-shaped clips 48, and is secured at its periphery at one end to the threaded stud 47 by means of an apertured lug 55 and at the other end to the fitting or coupling 45 by means of a complementary fitting or coupling 56 welded or otherwise secured to the sector. As shown in Figure 5, the couplings 45 and 56 constitute a union and are secured in sealed relation by means of a threaded stud 57 welded to the coupling 56 and a nut 58 threaded on the stud 57 and adapted to be seated in a depression 59 formed in the coupling 45. In order to obtain an air-tight connection between the couplings 45 and 56, a gasket 61 is interposed between their engaging surfaces. The sectors may be of any well-known construction such as for example indicated in Figure 5. As shown in this figure, the sectors comprise a drainage screen 62, to the opposite sides of which is secured a supporting screen 63. The peripheral edges of this structure are secured to a frame member 64 provided on each side with peripheral channels 65. The filter cloth is disposed over the outer faces of the supporting screen 63 and secured at its peripheral edges within the channel 65 by means of a caulking strip 66.

From an inspection of Figure 3, it will be noted that the interior of the sector 51 communicates through the couplings 45 and 56 with the filtrate manifold 38, and that in the same manner the sector 52 communicates with the filtrate manifold 39, the sector 53 with the filtrate manifold 41, and the sector 54 with the filtrate manifold 37. The sectors 51 of each disc are in alignment, and therefore constitute a longitudinally extending row of sectors. Since Figure 3 is a section taken on the line 3—3 of Figure 1, it will be noted that the disc shown in Figure 3 and made up of the sectors 51, 52, 53, and 54 would be the twelfth disc of the series of discs making up the filter. The disc shown in Figure 3 is therefore an even numbered disc. The connection between each of the sectors of the even numbered discs with their respective filtrate manifolds is shown in Figure 3, while the connection between the sectors of the odd discs and their respective filtrate manifolds is just the reverse of that shown in Figure 3. In other words, if it were to be assumed that the disc shown in Figure 3 is an odd numbered disc, the sector 51 would communicate with the manifold 37, the sector 52 with the manifold 38, the sector 53 with the manifold 39, and the sector 54 with the manifold 41. This sequence of connections permits the sectors to be discharged alternately, as will be more fully described in connection with the operation of the filter.

Referring now to Figure 1, the right hand end of the hollow central shaft 36 terminates in a flanged collar 71. Extending through the stuffing box 33 is a solid stub shaft 72, the left hand end of which terminates in a flanged collar 73 adapted to be secured to the flanged collar 71 by means of bolts. The shaft 72 is journaled in the bearing 32 and is secured at its extreme right hand end to a ring gear disposed within the gear housing 74 carried by the bracket 31. It will therefore be seen that the hollow shaft 36 together with its disc assembly may be rotated by connecting the ring gear within the housing 74 to any suitable driving mechanism.

Extending through the bearing 28 and the stuffing box 29 is a cored stub shaft 80. The right hand end of the shaft 80 terminates in a flange 81 adapted to be bolted to the flanged casting 44. The casting 44 is provided with four symmetrically disposed passages adapted to register with four similar passages 82, 83, 84 and 85 formed in the shaft 80. The left hand end of the shaft 80 (Figure 7) is secured to a rotary valve member 86 by means of bolts 87, and the valve member 86 is provided with four chambers 88, 89, 91 and 92, in communication respectively with the passageways 82, 83, 84, and 85 of the shaft 80. Each of the chambers 88, 89, 91 and 92 is provided with a valve seat 93 adapted to receive a valve 94 carried by the valve stem 95. Each of the valve stems 95 operates through a sleeve 96 provided with a flange 97 adapted to be secured over the left hand ends of the chambers 88, 89, 91 and 92. In order to maintain these chambers air-tight, the sleeves 96 are provided with stuffing boxes 98. The valve member 86 is adapted to rotate within a valve housing 101 sealed to the valve member by means of stuffing boxes 102 and 103. The valve housing 101 is provided on its lower side with a filtrate outlet 104 and on its upper side with an inclined cylinder 105 adapted to accommodate a hollow piston 106. The upper end of the hollow piston 106 is secured to a stem 107 arranged to pass through a stuffing box 108 formed in the plate 109 covering and secured to the upper end of the cylinder 105. The port 111 formed on one side of the cylinder 105 is adapted to register with a complementary port 112 formed in the piston 106, when the piston is in its lowermost position. As the piston is raised, it closes the port 111. The opposite side of the cylinder 105 is provided with a key 113, the inner end of which is adapted to engage a slot 114 formed in the piston 106, in order to prevent the rotation of the piston within the cylinder. Extending upwardly from the cover plate 109 is a bracket 116 and a lug 117. Pivoted to the lug 117 is a lever 118 provided with a notch 119 and a notch 120. The free end of the lever 118 is urged in a counter-clockwise direction by means of a spring loop 121. Pivoted to the bracket 116 is a control lever 122 provided with a pin 123 adapted to be received in either the notch 119 or the notch 120. The intermediate end of the control lever 122 is adapted to be received in the bifurcated end 124 of the stem 107, and to engage on its upward motion a pin 125 passing through the bifurcated end of the stem. A collar 126 is secured to the stem 107 intermediate its ends and is adapted to support a spring 127 which in turn supports a washer 128 slidably disposed on the stem 107. The piston 106 may be designated as a blow bridge and in Figure 7 is shown in its lowermost position urged in engagement with the valve member 86 by the spring 127 so that its port 112 is in registration with the port 111. The port 111 may be connected to a source of fluid pressure such as either air or flue gas. When it is desired to close the port 111, the lever 118 is moved slightly in a clockwise direction so that the pin 123 may be released from the notch 119. Control lever 122 is then moved upwardly until the pin 123 engages the notch 120. The lever 122 in moving upwardly engages the pin 125, thereby causing the blow bridge or piston 106 to move upwardly. Communication between the valve housing 101 and the chambers 88, 89, 91 and 92 is established by means of peripheral ports 129 formed in the valve member 86. It will also be noted that the peripheral ports 129 serve to establish communication between the lower end of the blow bridge or piston 106 and the chambers 88, 89, 91 and 92.

The operation of the filter as above described is as follows:

The cake discharge outlet 13 is closed by any suitable valve (not shown) and pulp or slurry is fed to the casing 1 through the pulp or slurry intake 12. The pulp or slurry passes through the chamber 16, through the openings 15 formed in the pan 14, and into the main chamber 17. The casing 1 is completely filled with slurry and the slurry maintained therein under superatmospheric pressure by means of a slurry pump (not shown). During the filtration operation the blow bridge or piston 106 is held in its uppermost position so that the port 111 is closed and each of the valves 94 is made to assume a fully open position. The only time that the valves 94 are closed as shown in Figure 7 is when it is desired to render inoperative all of the sectors communicating with any one of the four filtrate manifolds 37, 38, 39 and 41, and as a rule this is necessary only when a leak has developed in one or more of the sectors due to a break in the filter cloth. The differential filtering pressure caused by atmospheric pressure within the sectors and the superatmospheric pressure at which the pulp or slurry within the casing 1 is maintained causes the liquid content of the slurry to pass through the filter medium, through the filtrate manifolds, through the chambers 88, 89, 91 and 92, and out through the filtrate outlet 104. The solid content of the pulp or slurry is deposited as a cake on the outer surface of the filter medium. When filtration has progressed to a point where an economical rate of filtration is no longer being obtained, further filtration is stopped by shutting off the slurry pump, opening the return to the supply tank, and blowing back the excess from the body of the filter in the usual manner. A free space must of course always remain between adjacent cakes, for if adjacent cakes were permitted to touch, an unbalanced condition would result, causing damage to the filter.

To discharge the cake formed on the sectors, the casing 1 is drained of slurry and then the shaft 36 is rotated by means of the ring gear within the housing 74 at a rate of about one revolution per minute. The port 111 is opened by moving the blow bridge or piston 106 to its lowermost position, and the port 111 is connected to any suitable source of fluid pressure, preferably air or gas. Upon the rotation of the valve member 86 which rotates with the hollow shaft 36, the fluid entering the port 111 passes through the lower end of the blow bridge or piston 106 and successively passes through each of the filtrate manifolds 37, 38, 39 and 41. From these filtrate manifolds the fluid passes through the couplings 45 and 56 to the alternate sectors connecting with each of the filtrate manifolds.

From an inspection of Figure 6, it will be noted that since the cylinder 105 is inclined at a slight angle to the horizontal plane passing through the axis of the filter, the blow back or reverse current of fluid used in discharging the cakes from the sectors is successively introduced into the passageways 82, 83, 84 and 85 formed in the shaft 80 before the corresponding filtrate manifolds assume a horizontal position. However, there is a certain time interval required for the fluid to pass from the valve to the filtrate manifolds, and by the time the fluid has reached the manifold which has been placed in communication with the blow bridge, that particular manifold will have reached a substantially horizontal position. In other words, by suitably locating the blow port, the disc sectors may be inflated when the manifold to which they are connected is in a horizontal position.

Referring now to Figure 3, it will be seen that the manifold 38 has assumed a substantially horizontal position and in this position the blow back or reverse fluid current will enter each of the sectors communicating therewith. At this stage of the cycle, the sectors 51 of the even numbered discs and sectors 52 of the odd numbered discs will be discharged. When the filtrate manifold 37 (due to the clockwise rotation of the disc assembly) has assumed a horizontal position, the sectors 51 will of course occupy the lower right hand quadrant and in this position the sectors 51 of the odd numbered discs and sectors 54 of the even numbered discs will be discharged. It is to be noted that at this stage of the cycle all of the sectors 51 of both the even and odd numbered discs will have been discharged. When the manifold 41 has been rotated to a horizontal position, the sectors 54 will occupy the lower right hand quadrant and at this point the sectors 54 of the odd numbered discs and sectors 53 of the even numbered discs will be discharged. When the filtrate manifold 39 assumes a horizontal position, the sectors 53 will occupy the lower right hand quadrant and at this stage of the cycle the sectors 53 of the odd numbered discs and sectors 52 of the even numbered discs will be discharged. By discharging at one time the alternate sectors in the row of sectors occupying the lower right hand quadrant and the intermediate sectors occupying the upper right hand quadrant, contact between the cakes formed on adjacent sectors is prevented and a free vertical drop of the cake is permitted. In this connection, it is to be noted that the scroll compartment 4 has been disposed slightly to the right of a vertical plane passing through the axis of the filter so that the discharged cake may drop substantially vertically into the scroll compartment. By discharging the cake in this manner the central shaft does not form an obstruction to the cake dropped from the section in the upper right hand quadrant, and the right hand filtrate manifold, due to its downward movement, tends to force the cake discharged from the sectors in the lower right hand quadrant into the scroll compartment.

Although each of the discs of the filter above described has been divided into four sectors, any other desired division may be made. As a matter of fact, even if the discs are not sectionalized, they can be alternately discharged by the use of a suitable valve and filtrate manifold arrangement.

A filter constructed and operated as above described has the following advantages:

By connecting the sectors to filtrate manifolds located peripherally of the filter discs and conveying the filtrate away through these manifolds rather than through the central shaft, it is possible to use a much smaller central shaft and therefore to increase the effective filtering area of the sectors. Furthermore, by forming the connections between the sectors and the filtrate manifolds at the periphery of the discs rather than adjacent the central shaft as has been the practice heretofore, a better connection can be made, for obviously there is more room in which to work, and the sectors can be more readily detached from the cradle formed by the filtrate manifolds and the central shaft.

The disc assembly including the central shaft and the filtrate manifolds may be readily disconnected from the rest of the filter and removed from the casing.

The automatic valve permits one or more of the filtrate manifolds to be put out of operation without impairing the operation of the other manifolds and also enables the sectors to be alternately discharged.

Heretofore all of the cakes formed on the discs of a pressure filter have been discharged at the same time, and consequently it has been necessary to provide a scroll capable of taking care of the entire load. In a filter embodying the objects of my invention, wherein the sectors are alternately and successively discharged, the scroll is required to handle only one-fourth of the entire load at any one time and therefore may be made much lighter. The alternate discharge of the sectors permits the use of a shorter filter and a smaller scroll and at the same time prevents contacting of cakes formed on adjacent sectors during the discharge period.

I claim:

1. A filter comprising: a casing; a shaft supported within said casing; a plurality of filter discs supported in spaced relation along said shaft, each of said discs being formed by a plurality of sectors and each sector of each disc being in alignment with the corresponding sectors of the other discs, so that there are as many longitudinally extending rows of sectors as there are sectors in each disc; longitudinally extending filtrate manifolds associated with said sectors, there being as many manifolds as there are rows of sectors; means for connecting each of said manifolds to the alternate sectors in one row and to the intermediate sectors of an adjacent row; and an automatic valve associated with said manifolds for successively subjecting said manifolds to a reverse pressure.

2. A filter comprising: a casing; a shaft supported within said casing; a plurality of filter discs supported in spaced relation along said shaft, each of said discs being formed by a plurality of sectors and each sector of each disc being in alignment with the corresponding sectors of the other discs, so that there are as many longitudinally extending rows of sectors as there are sectors in each disc; longitudinally extending filtrate manifolds associated with said sectors, there being as many manifolds as there are rows of sectors; quickly detachable couplings for connecting each of said manifolds to the outer peripheries of the alternate sectors in one row and the intermediate sectors of an adjacent row; and an automatic valve associated with said manifolds for successively subjecting each of said manifolds to a reverse pressure.

3. A filter comprising: a casing; a shaft supported within said casing; a plurality of filter discs supported in spaced relation along said shaft, each of said discs being formed by a plurality of sectors and each sector of each disc being in alignment with the corresponding sectors of the other disc, so that there are as many longitudinally extending rows of sectors as there are sectors in each disc; filtrate manifolds extending longitudinally between and substantially at the peripheries of said rows of sectors; means for connecting each of said manifolds to the alternate sectors in one row and to the intermediate sectors of an adjacent row; and an automatic valve associated with said manifolds for successively subjecting each of said manifolds to a reverse pressure.

4. The method of discharging a filter wherein a plurality of sectionalized discs are mounted in spaced relation along a common shaft and wherein the corresponding sections of each disc are in alignment so that there are as many rows of sections as there are sections in each disc, comprising: successively subjecting groups of sections consisting of alternate sections in one row and intermediate sections in an adjacent row, to a reverse fluid pressure.

5. The method of discharging a filter wherein a plurality of sectionalized discs are mounted in spaced relation along a common shaft and wherein the corresponding sections of each disc are in alignment so that there are as many rows of sections as there are sections in each disc, comprising: subjecting not more than every other section in any given row to the action of a reverse fluid pressure at one time.

6. The method of operating a filter wherein a plurality of filter elements are mounted in spaced relation along a common shaft, comprising: first discharging the alternate filter elements and then discharging the remaining intermediate filter elements.

THEODORE L. GENTER.